July 1, 1952     F. C. JOHNSON     2,601,821
APPARATUS FOR PERCOLATING COFFEE
Filed Dec. 27, 1948
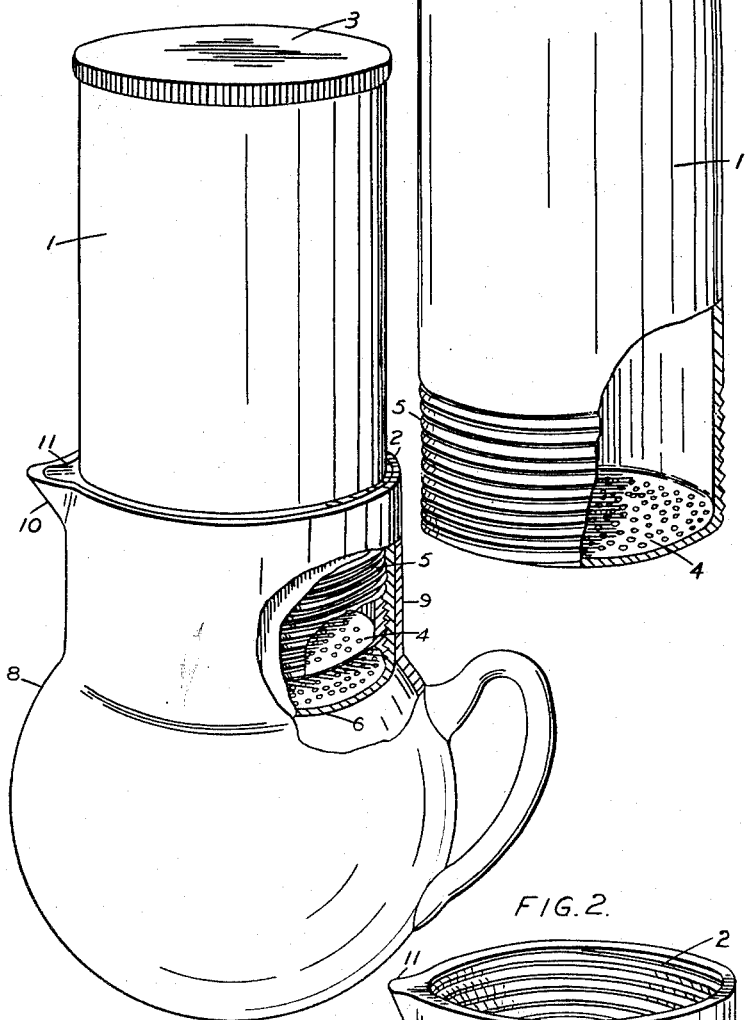
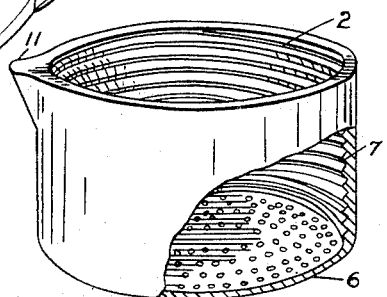
Inventor
Francois C. Johnson
Attorney Patented July 1, 1952

2,601,821

UNITED STATES PATENT OFFICE 2,601,821

APPARATUS FOR PERCOLATING COFFEE

François Cecil Johnson, Strensall, England

Application December 27, 1948, Serial No. 67,337
In Great Britain January 13, 1948

2 Claims. (Cl. 99—316)

This invention relates to apparatus for percolating coffee and has for its primary object the provision of a coffee percolating apparatus, in which the rate of flow of water percolating through ground coffee contained therein can be regulated to control the degree of extraction of the coffee, thus rendering the percolating apparatus economical in use.

A further object of the invention is to provide an apparatus for percolating coffee, which is simple in construction, is cheap to manufacture, and which can be readily assembled and again dismantled after use for the purpose of cleansing, storage, etc.

According to the invention, there is provided an apparatus for percolating coffee, comprising two co-axial sieve members relatively adjustable in an axial direction so as to regulate the space between them and thereby vary the rate of percolation through ground coffee when disposed in the aforesaid space.

Further, according to the invention, there is provided apparatus for percolating coffee comprising a lower container having a sieve member and adapted to receive ground coffee, an upper container for insertion into the lower container, and a second sieve member associated with the said upper container for positive movement in relation to the said first sieve member for the purpose of varying pressure exerted by the said second sieve member on ground coffee contained in the said lower container.

In a preferred form of embodiment of the invention the two containers are cylindrical in form, the first sieve member being integral with the lower container and the second sieve member integral with the upper container, said upper container being externally threaded to engage internal threads on the lower container, so that the space between the sieve members can be varied by axial adjustment of the containers. With such arrangement, when liquid coffee is being prepared in the percolator, the requisite amount of ground coffee is placed in the lower container, whereupon the upper container is screwed into the lower container to effect the desired pressure on the ground coffee, and boiling water is then introduced into the upper container. It will be obvious that if the water percolates through the ground coffee too quickly, a tightening of the upper container in the lower container by means of the corresponding threads will bring about a greater degree of compression of the ground coffee by reason of the increased pressure of the upper sieve member against the surface thereof, with a consequent slowing down of the rate of percolation. Conversely, if the rate of percolation is too slow, or if a weaker extraction of coffee is desired, the pressure on the ground coffee can be relieved by unscrewing the upper container, and the water will then be able to percolate more freely. A heat-insulated top is preferably provided in association with the upper container to permit manipulation of the apparatus after the introduction of boiling water.

The liquid coffee is received in a receptacle into the neck of which the lower container is arranged to fit, means being provided to prevent the lower container from turning in the neck of the receptacle, to facilitate the relative adjustment between the upper and lower containers.

In order that the invention may be clearly understood, one embodiment thereof will now be described, by way of example, with reference to the accompanying drawing in which:

Figure 1 is a perspective view of the upper container of the percolating apparatus, partly broken away to provide a view of the interior, Figure 2 is a perspective view of the lower container, also partly broken away, and Figure 3 is a perspective view of the upper and lower containers applied to a receptacle for receiving liquid coffee, this view also being partially broken away to show the relative disposition of the parts.

Referring to the drawing, the percolating apparatus comprises an upper cylindrical container 1, which is preferably composed of metal, and a lower cylindrical container 2, also preferably composed of metal. The container 1, into which boiling water is introduced, as described below, when liquid coffee is being prepared, is furnished with a heat-insulated top 3 to permit of manipulation of the apparatus when in use, and a sieve member 4 integral therewith to constitute the bottom thereof, and through which the hot water passes into the lower container 2. The top 3 is secured in any convenient manner so as to be immovable on the container 1. At the end furnished with the sieve member 4 the container 1 possesses external threads 5.

The lower container 2, which is adapted to receive ground coffee, is also furnished with a sieve member 6, integral therewith and constituting the bottom thereof, which sieve member supports the ground coffee when introduced into the container 2. The container 2 is also furnished with internal threads 7 adapted for engagement with the threads 5 on the container 1.

It will be apparent that by screwing or unscrewing the container 1 within the container 2 the sieve members 4 and 6 can be adjusted as desired in an axial direction to regulate the space between them and thereby vary the rate of percolation through the ground coffee disposed therein.

The apparatus thus described can be adapted for use in conjunction with a special receptacle 8 (Figure 3) for reception of the prepared liquid coffee. This receptacle, which may consist of metal, porcelain, earthenware or any other suitable material, is furnished with a cylindrical neck 9, the depth of which is approximately equal to that of the container 2, and into which the container 2 can be snugly fitted. The neck 9 of the receptacle 8 possesses at a suitable point of its upper marginal portion a pouring lip or spout 10, and at a suitable point a projection or lip 11 is provided on the container 2 so that, when the container 2 is inserted into the neck 9 of the receptacle 8, the lip 11 nests snugly within the lip or spout 10. This arrangement serves the dual purpose of preventing the container 2 from falling into the receptacle 8 when fitted in the neck 9 thereof, and also of preventing the container 2 from turning within the neck 9 when the two containers 1 and 2 are screwed or unscrewed. Naturally other means may also be provided to achieve the same object, but the arrangement shown has been found to be particularly convenient, inasmuch as it utilises for its purpose the lip or spout which will be provided in any case to enable the liquid coffee to be poured conveniently out of the receptacle 8.

The useful volume of the receptacle 8, that is to say, the capacity of the body of the receptacle ignoring that proportion thereof which is taken up by the container 2, will be at least equal to, and preferably slightly greater than the total volume of the container 1.

The operation of the percolating apparatus is as follows:

Ground coffee in the desired quantity is placed in the container 2, to rest on the sieve member 6, and the container 1 is thereupon screwed into the container 2 so as to cause the sieve member 4 to bear against the ground coffee with the desired degree of pressure. The two containers 1 and 2 are then fitted as a unit in the receptacle 8, the top 3 is removed, and boiling water is poured into the container 1, whereupon the top 3 can be replaced. The water, passing through the perforations of the sieve member 4, percolates through the ground coffee disposed between the two members 4 and 6, and the liquid coffee passes through the perforations in the sieve member 6 into the receptacle 8. It will be obvious that the greater the degree of compression of the ground coffee between the two sieve members 4 and 6, the more slowly will the water percolate through the ground coffee, and the greater therefore, will be the degree of extraction of the coffee.

If the rate of percolation is too slow, it can be increased by unscrewing the container 1 to the necessary extent in the container 2, in which connection the latter will be firmly held against rotation by the lip or projection 11 nesting in the lip or spout 10. Conversely, if the rate of percolation is too rapid, it can be retarded by screwing the container 1 more tightly into the container 2. If desired, of course, the container 2 can be fitted in the neck 9 of the receptacle 8 before the coffee is introduced into the same, and the container 1 can be screwed into the container 2 when the latter is disposed in the neck 9. Or if desired, provided the requisite degree of pressure is applied to the ground coffee between the two sieve members 4 and 6 beforehand, the two containers can be used in conjunction with any desired receptacle for reception of the liquid coffee, being merely allowed to rest thereon until the water has percolated through.

When the liquid coffee has been prepared, that is to say, when the water has passed through from the container 1 to the receptacle 8, the two containers 1 and 2 can be removed as a unit, and the liquid coffee is then ready for serving and the top of the receptacle 8 can be closed by a lid.

It will be understood that many modifications may be made to the construction illustrated in the drawing, thus for example in certain circumstances the two containers 1 and 2 may be replaced by one single container, and the one of the two sieve members can be made to be positively adjustable within the container in relation to the second sieve member. This may be accomplished by means of a threaded spindle, passing through a screw threaded bush in the container, one sieve member being rigidly secured to the spindle to be moved upwards or downwards within the container on rotation of the spindle.

Further, the means for preventing turning movement of the container within the neck of the receptacle may be effected by means other than the lips 10, 11 described above, for example a bayonet connection may be employed for this purpose.

I claim:

1. In an apparatus for percolating coffee, a lower cylindrical internally threaded container, a first sieve member integral with said lower container, an upper cylindrical container having an external thread for engaging with said threaded lower container, a second sieve member integral with said upper container and coaxial to said first sieve member, said two sieve members forming a space between them to receive ground coffee, a bottom receptacle to receive liquid percolating through said sieve members from said upper container and having a neck portion shaped to correspond to the outer contour of said lower container to receive said lower container snugly therein, said space being positively regulatable by screwing or unscrewing said upper container within said lower container by means of said threads to permit of variation in pressure of the said sieve members on ground coffee in the said space therebetween, and thus to regulate at will the rate of percolation of liquid through the said coffee into said bottom receptacle, and means to prevent rotation of the said lower container in said neck portion when screwing or unscrewing said upper container, whereby said space may be regulated during percolation.

2. In an apparatus for percolating coffee, a lower cylindrical internally threaded container, a first sieve member integral with said lower container, an upper cylindrical container having an external thread for engaging with said threaded lower container, a second sieve member integral with said upper container and coaxial to said first sieve member, said two sieve members forming a space between them to receive ground coffee, a bottom receptacle to receive liquid percolating through said sieve members from said upper container and having a neck portion shaped to correspond to the outer contour of said lower container to receive said lower container snugly therein, said space being positively regulatable by screwing or unscrewing said upper container within said lower container by means of said threads, a pouring lip formed in said neck portion of said bottom receptacle, and a projection on the upper marginal portion of said lower container adapted to fit snugly into said pouring lip to prevent rotation of the said lower container in said neck portion when screwing or unscrewing said upper container.

FRANÇOIS CECIL JOHNSON.

REFERENCES CITED

The following references are of record in the file of this patent:

UNITED STATES PATENTS

| Number | Name | Date |
| --- | --- | --- |
| 26,229 | Gatchell | Nov. 22, 1859 |
| 537,961 | Bechaux | Apr. 23, 1895 |
| 713,192 | Aubry | Nov. 11, 1902 |
| 1,687,345 | Meyer | Oct. 9, 1928 |
| 1,769,729 | Wentorf | July 1, 1930 |